(12) United States Patent
Vanmeulder et al.

(10) Patent No.: US 9,062,212 B2
(45) Date of Patent: Jun. 23, 2015

(54) AQUEOUS RADIATION CURABLE COATING COMPOSITIONS

(75) Inventors: Guido Vanmeulder, Sint-Genesius-Rode (BE); Jean-Yves Salviato, Les Bons Villers (BE)

(73) Assignee: ALLNEX BELGIUM SA, Brussels (BE)

( * ) Notice: Subject to any disclaimer, the term of this patent is extended or adjusted under 35 U.S.C. 154(b) by 0 days.

(21) Appl. No.: 14/130,214

(22) PCT Filed: Jul. 19, 2012

(86) PCT No.: PCT/EP2012/064217
§ 371 (c)(1),
(2), (4) Date: Dec. 30, 2013

(87) PCT Pub. No.: WO2013/020791
PCT Pub. Date: Feb. 14, 2013

(65) Prior Publication Data
US 2014/0128533 A1    May 8, 2014

(30) Foreign Application Priority Data

Aug. 9, 2011 (EP) .................................... 11176917

(51) Int. Cl.
| | | |
|---|---|---|
| *C09D 7/00* | (2006.01) | |
| *C08F 2/46* | (2006.01) | |
| *C08G 18/67* | (2006.01) | |
| *C08F 220/06* | (2006.01) | |
| *C09D 175/16* | (2006.01) | |
| *C09D 7/12* | (2006.01) | |
| *C09D 5/02* | (2006.01) | |
| *C08F 222/10* | (2006.01) | |
| *C08K 3/36* | (2006.01) | |
| *C08L 33/02* | (2006.01) | |

(52) U.S. Cl.
CPC . *C09D 7/005* (2013.01); *C08F 2/46* (2013.01); *C08G 18/672* (2013.01); *C08F 220/06* (2013.01); *C08F 222/1006* (2013.01); *C08K 3/36* (2013.01); *C09D 175/16* (2013.01); *C08L 33/02* (2013.01); *C09D 7/125* (2013.01); *C09D 5/02* (2013.01)

(58) Field of Classification Search
CPC ........ C09D 7/005; C09D 7/00; C09D 167/06; C09D 175/14; C09D 11/00; C09D 163/10; B05D 5/10; B05D 3/06; B05D 7/24
USPC .......................................... 524/507; 427/487
See application file for complete search history.

(56) References Cited

U.S. PATENT DOCUMENTS

| | | |
|---|---|---|
| 3,966,572 A | 6/1976 | Carder |
| 4,554,018 A | 11/1985 | Allen |
| 5,596,065 A | 1/1997 | Gerlitz et al. |
| 5,990,192 A | 11/1999 | Gerlitz et al. |
| 7,728,054 B2 | 6/2010 | Lunzer et al. |
| 2003/0191208 A1* | 10/2003 | Park et al. ........................ 522/71 |
| 2009/0270581 A1 | 10/2009 | Tielemans et al. |
| 2011/0017085 A1 | 1/2011 | Seecharan et al. |
| 2011/0086180 A1 | 4/2011 | Tielemans |
| 2011/0112244 A1 | 5/2011 | Van Holen et al. |

FOREIGN PATENT DOCUMENTS

| | | |
|---|---|---|
| CN | 101421368 | 4/2009 |
| CN | 101622290 | 1/2010 |
| EP | 1 923 375 | 5/2008 |
| WO | 2007/118781 | 10/2007 |
| WO | 2008/101661 | 8/2008 |
| WO | 2010/056182 | 5/2010 |

OTHER PUBLICATIONS

International Search Report issued Aug. 29, 2012 in International (PCT) Application No. PCT/EP2012/064217.

* cited by examiner

*Primary Examiner* — Robert Harlan
(74) *Attorney, Agent, or Firm* — Wenderoth, Lind & Ponack, L.L.P.

(57) ABSTRACT

The present invention relates to an aqueous radiation curable coating composition comprising at least one radiation curable polymer (A) and at least one organic matting polymer (B) providing uniform matt coatings.

15 Claims, No Drawings

AQUEOUS RADIATION CURABLE COATING COMPOSITIONS

The invention relates to aqueous radiation-curable compositions providing matt coatings and more particular to compositions that are suitable for making field applied matt coatings on various substrates such as wood, plastics and composites.

Radiation curable coatings have recently moved from factory applied applications to field applied applications, with flooring as the main market. Currently, there are three main substrates for this application: concrete, wood and VCT (vinyl composition tile).

The benefits of radiation cured field applied coatings are similar to factory-applied coatings. In addition, the immediate cure aspect provides an added benefit of quality, since the finish will not be damaged once it is cured, and cost savings to the end user through immediate use.

Coatings for flooring must have a high level of chemical and stain resistance, hardness, scratch and abrasion resistance, as well as a uniform gloss level.

Aqueous radiation curable resins are a good choice for field-applied coating as they permit to obtain low viscosity without the use of solvent or high amount of monomers.

WO2010/056182 describes the use of UV radiation curable polyurethane dispersions for field applied floor coatings. However, in general radiation curable polyurethane dispersions that are suitable to provide coatings, especially coatings suitable for floor coatings, do not provide matt coatings.

The compositions known in the art generally do not permit to obtain matt coatings combined with a high end hardness, scratch and stain resistance that make them suitable for floor coatings.

The classical method to obtain matt coatings is to formulate the dispersion with inorganic matting agent consisting of micrometric or nanometric particles, generally silica particles in combination or not with waxes. However, these formulations have the following drawbacks: low shelf life of the formulations due to precipitation of the inorganic particles, non-uniform appearance of the coatings with areas with different degrees of gloss, loss of transparency of the coatings. Also as the matting agent is mainly located at the surface of the coating, wearing or abrasion of it, can result in non-homogeneous increase of the gloss of the coating; hence the coatings obtained with such compositions usually do not present a so-called deep matt aspect. The gloss obtained with these coatings is also dependent on the thickness of the coating layer. There is also a need to obtain very low gloss that cannot be reached with these formulations.

Moreover the perception of the matt effect obtained with existing coatings is largely dependent on the way they are exposed to light : light impacting the surface at small angles gives the impression of a more matt surface compared to vertical exposure. This may lead to a visual subjective impression of non-homogeneity of the coatings, especially when they are covering a big area. Hence there is still a need for coatings that have a similar gloss level at different angles of light impact and observation.

When painting large surfaces, it is generally necessary to join up to the edge of a paint film which has been left for an appreciable time. This needs to be done by blending this edge with free working paint without any lap showing. The film is said to present a "wet edge". Leaving a wet edge creates a seamless look of the finish. If it does dry, the result is a "dry edge" that creates a line and ruins the entire look of the finish. Aqueous radiation curable coating compositions currently available generally also do not have the so-called wet edge property.

The present invention describes new coating compositions that overcome these drawbacks and that permit to obtain matt coatings and that also permit to obtain extremely high matting effect.

The present invention therefore relates to an aqueous radiation curable coating composition comprising at least one radiation curable polymer (A) and at least one organic matting polymer (B) selected from acrylic copolymers having a viscosity in the range of 10 to 10000 mPa·s, as measured on a 0.5% by weight water solution of the matting organic polymer at a pH of from 7 to 8 according to DIN EN ISO 3219.

The present invention further relates to an aqueous radiation curable coating composition comprising at least one radiation curable polymer (A), at least one organic matting polymer (B) and at least one inorganic matting agent (C).

The radiation curable composition according to the invention may also comprise other organic matting agents than (B) such as for example, waxes.

The aqueous radiation curable coating composition according to the invention is preferably a dispersion comprising at least one radiation curable polymer (A).

The radiation curable polymer (A) is preferably a radiation curable ethylenically unsaturated polyurethane, more specifically under the form of a radiation curable polyurethane dispersion. Radiation curable ethylenically unsaturated polyurethane dispersions have been described in the literature and are commercially available.

Ethylenically unsaturated polyurethane dispersions have been made from the reaction of one or more polyisocyanates, at least one hydrophilic compound containing at least one reactive group capable to react with isocyanate groups and which is capable to render the polyurethane dispersible in aqueous medium either directly or after the reaction with a neutralizing agent to provide a salt, optionally one or more low and/or high molecular weight polyols, optionally containing one or more ethylenically unsaturated groups, and usually one or more hydroxyfunctional ethylenically unsaturated monomers, and optionally with one or more chain extenders such as polyamines. The resulting polymers generally have a high molecular weight and are mostly physically drying, the so called tack free before radiation curing, due to a high content of hard segments or because their glass transition temperature Tg is sufficiently high. This is especially so when the polymer contains hard urea segments. Ethylenically unsaturated polyurethanes can often be made from the end capping of an isocyanate terminated polyurethane prepolymer with an ethylenically unsaturated, especially (meth)acrylated monomer.

By polymerizable ethylenically unsaturated groups is meant to designate in the present invention carbon-carbon double bonds which under the influence of irradiation and/or a (photo)initiator can undergo radical polymerization. By irradiation is meant exposure to actinic radiations such as ultraviolet radiations, gamma-rays, X-rays or exposure to electron beam. The polymerizable ethylenically unsaturated groups are generally chosen from (meth)acrylic and allylic groups, preferably (meth)acrylic groups, most preferably acrylic groups. In the present invention, the term "(meth)acryl" is to be understood as to encompass both acryl and methacryl compounds or derivatives as well as mixtures thereof.

Polyisocyanate compounds are meant to designate organic compounds comprising at least two isocyanate groups, preferably not more than three isocyanate groups. The polyisocyanate compound is most preferably a diisocyanate. The polyisocyanate compound is generally selected from aliphatic, cycloaliphatic, aromatic and/or heterocyclic polyisocyanates or combinations thereof. Examples of aliphatic and cycloaliphatic polyisocyanates are 1,6-diisocyanatohexane (HDI), 1,1'-methylene bis[4-isocyanatocyclohexane] (HI12MDI), 5-isocyanato-1-isocyanatomethyl-1,3,3-trimethyl-cyclohexane (isophorone diisocyanate, IPDI). Aliphatic polyisocyanates containing more than two isocyanate groups are for example the derivatives of above mentioned diisocyanates like 1,6-diisocyanatohexane biuret and trimer. Examples of aromatic polyisocyanates are 1,4-diisocyanatobenzene (BDI), 2,4- and/or 2,6-diisocyanatotoluene (TDI), 1,1'-methylenebis[4,4'- or 2,4-isocyanatobenzene] (MDI), xylylene diisocyanate (XDI), tetramethylxylene diisocyanate (TMXDI), 1,5-naphtalene diisocyanate (NDI), tolidine diisocyanate (TODI) and p-phenylene diisocyanate (PPDI). Aromatic polyisocyanates containing more than two isocyanate groups are for example polymeric MDI and the derivatives of above mentioned diisocyanates like TDI trimer or the reaction products obtained by reaction with trimethylolpropane. The polyisocyanate is preferably selected from aliphatic and cycloaliphatic polyisocyanates.

By hydroxyfunctional ethylenically unsaturated monomers is meant to designate in the present invention compounds comprising at least one unsaturated function such as (meth)acrylic group and one hydroxyl group. Preferred are (meth)acryloyl mono-hydroxy compounds, more particularly poly(meth)acryloyl mono-hydroxy compounds. Acrylates are particularly preferred. Suitable compounds are the (meth)acrylic esters of linear and branched polyols in which at least one hydroxy functionality remains free, like hydroxyalkyl (meth)acrylates having 1 to 20 carbon atoms in the alkyl group such as are hydroxyethyl (meth)acrylate, hydroxypropyl (meth)acrylate, hydroxybutyl (meth)acrylate. Particularly preferred are compounds comprising at least two (meth) acryl functions such as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents. Their poly(caprolactone) equivalents are also suitable.

Polyols optionally used in the preparation of the polyurethanes may be high molecular weight polyols having a number average molecular weight of at least 400, or low molecular weights polyols having a molecular weight lower than 400 or any combinations or mixtures thereof. High molecular weight polyols preferably have a number average molecular weight which does not exceed 5000, more preferably not 1000. Examples of low molecular weight polyols are ethyleneglycol, diethyleneglycol, propyleneglycol, dipropyleneglycol, neopentylglycol, 1,3-propanediol, 1,3-butanediol, 1,4-butanediol, 1,5-pentanediol, 1,6-hexanediol, 1,7-heptanediol, 1,8-octanediol, 2-ethyl-1,6-hexanediol, cyclohexane dimethanol, trimethylolpropane, di-trimethylol propane, glycerol, pentaerythritol and di-pentaerythritol. Examples of high molecular weight polyols are polyester polyols, polyether polyols, polycarbonate polyols and polyacrylate polyols, as well as combinations thereof. Particularly preferred are polyester polyols, especially those made from the polycondensation of neopentylglycol and adipic acid and/or isophthalic acid.

By ethylenically unsaturated polyols are meant to designate in the present invention compounds comprising at least one unsaturated function such as (meth)acrylic group and at least two hydroxyl functions. Preferred are (meth)acryloyl dihydroxy compounds and poly(meth)acryloyl dihydroxy compounds. Compounds comprising two hydroxyl functions and at least two (meth)acrylate functions are preferred. Acrylates are particularly preferred. Particularly preferred compounds are those obtained from the reaction of diglycidyl compounds with (meth)acrylic acid.

The hydrophilic compound is generally selected from polyols comprising a functional group that can exhibit an ionic or non-ionic hydrophilic nature. Preferably it is a polyol containing one or more anionic salt groups, such as a carboxylate and sulfonate salt groups or acid groups which may be converted to an anionic salt group, such as carboxylic acid or sulfonic acid groups. Preferred are hydroxycarboxylic acids represented by the general formula $(HO)_xR(COOH)_y$, wherein R represents a straight or branched hydrocarbon residue having 1 to 12 carbon atoms, and x and y independently are integers from 1 to 3. The most preferred hydroxycarboxylic acids are the α,α-dimethylolalkanoic acids, wherein x=2 and y=1 in the above general formula, such as for example, 2,2-dimethylolpropionic acid and 2,2-dimethylolbutanoic acid.

Chain-extenders preferably comprise one or more active amino groups capable of making a chain extension of the remaining isocyanate end-groups of the prepolymer. The chain extender is preferably a polyamine, more preferably a water-soluble aliphatic, alicyclic, aromatic or heterocyclic primary or secondary polyamine or hydrazine, having up to 60, preferably up to 12 carbon atoms. The polyamine used has preferably an average functionality of 2 to 4, more preferably 2 to 3. Examples of such chain extenders useful herein comprise hydrazine, 1,2-ethylenediamine, 1,4-butanediamine, 1,6-hexanediamine, 2-methyl-1,5-pentanediamine, 1,8-octanediamine, 1,10-decane-diamine, 1,12-dodecanediamine, piperazine, isophoronediamine, meta xylilenediamine, polyethylene amines, polyoxyethylene amines and polyoxypropylene amines, as well as mixtures thereof.

The radiation curable polyurethane dispersions used in the present invention can contain one or more (meth)acrylated monomer(s). Examples of such monomers are trimethylolpropane triacrylate, glycerol triacrylate, pentaerythritol tetraacrylate, ditrimethylolpropane tetraacrylate, dipentaerythritol hexaacrylate and their (poly)ethoxylated and/or (poly) propoxylated equivalents, as well as mixtures thereof. The radiation curable polyurethane dispersion preferably contains at least 50% by weight of the radiation curable polymer based on the total weight of radiation curable polymer and radiation curable monomer.

The radiation curable polyurethane dispersions used in the present invention generally have a dry solids content between 30 and 60% and preferably of at least 35%.

Examples of such radiation curable polyurethane dispersions have been described in U.S. Pat. Nos. 5,596,065, 5,990, 192, 7,728,054, US 20090270581, US 20110086180, U.S. 20110112244 and US 20110017085. Examples of such dispersions are commercialized under the names of UCECOAT®7674, UCECOAT®7655, UCECOAT®7699, UCECOAT®7571, UCECOAT®7689, UCECOAT®7690, UCECOAT®7890, UCECOAT®7578, UCECOAT®7710, UCECOAT®7730 and UCECOAT®7733. Another suitable dispersion is UCECOAT®7631.

Preferred radiation curable polyurethane dispersions (A) are those that permit to obtain tack free or substantially tack free coatings before curing.

Mixtures of one or more of these polyurethane dispersions can be used.

In the present invention, by matting polymer is intended to designate an organic polymer that when added to a coating composition in a concentration of at most 3% by weight, provides a matting effect to the coating obtained after curing.

The matting polymer preferably provides a coating having a gloss at 20° measured according to ISO 2813 of at least 30% lower than the same composition without the matting polymer (B).

In the present invention, gloss is measured according to ISO 2813 at angles of incidence of, respectively, 20°, 60° and 85°. In the gloss measurement the coated surface is exposed to the unpolarised light beam of a white lamp using an angle of incidence of respectively 20°, 60° and 85°. The intensity of the reflected light beam is measured with a photo detector and compared to the intensity of the beam directly emitted by the lamp. The result is expressed in % of reflected light intensity relative to the direct beam intensity.

By copolymer is intended to designate polymers obtained from at least 2 different monomers.

The organic matting polymer (B) useful in the present invention is generally one having a viscosity in the range of 10 to 10000 mPa·s, as measured on a 0.5% by weight (solids) water solution of the matting organic polymer at a pH of from 7 to 8, preferably at a pH of 7, according to DIN EN ISO 3219, with a Cone & plates rotational viscometer at 25° C. and with a defined shear rate of 20 s$^{-1}$; pH adjustment, if necessary, is made with a 0.01N NaOH solution in water. Preferred matting polymers useful in the present invention have a viscosity of at least 100 mPa·s; more preferred are matting polymers whose viscosity does not exceed 5000 mPa·s.

The matting polymer (B) useful in the present invention is preferably selected from anionic acrylic copolymers, particularly from those based on an acrylic backbone obtained by polymerization of at least 50%, more preferably at least 65% and most preferably at least 75%, by weight of (meth)acrylic acid and/or a salt thereof and from 0.003 to 50%, preferably less than 35% and most preferably less than 25%, by weight of at least one ethylenicaly unsaturated monomer (component B2) that does not contain any carboxylic groups. By carboxylic groups is intended to designate carboxylic acid groups or salts thereof. Preferred are anionic acrylic copolymers comprising at least 1%, more preferably at least 2% and most preferably at least 3%, by weight of component B2.

Preferred are those acrylic polymers wherein the free carboxylic acid groups are partially or completely neutralized with a base (B1). This neutralization improves the solubility/dispersibility in water of the acrylic polymer and also permits to obtain solution in water with a pH of at least 5, preferably at least 6 and more preferably greater than 7. Increasing the pH of anionic acrylic polymer solutions or dispersions generally leads to an increase of their viscosity. However, preferred anionic acrylic polymers are those wherein their increase in viscosity is sufficiently limited in order to obtain only a negligible impact on the rheology and viscosity of the formulation with the radiation curable polymer, at the level of addition of anionic acrylic polymer addition needed to obtain the required matting effect.

The base (B1) used in the invention to neutralize partially or completely the carboxylic acid groups is generally selected from alkali metal hydroxides, carbonates or hydrogenocarbonates, ammoniac or tertiary amines. Although primary and secondary amines could be used, these are not preferred as they can react with the double bond present on the radiation curable polymer (A) by the reaction known as Michael addition.

Ethylenically unsaturated monomers (B2) that do not contain carboxylic groups are generally selected from compounds that contain one or more reactive double bonds by molecule that can copolymerize with (meth) acrylic acid. The number of double bonds by molecule is preferably from 1 to 4 and most preferably from 1 to 2. Blends of monomers can be also used. Non-exhaustive examples of such monomers are (meth)acrylic esters, (meth)acrylamides, allylic and other vinylic derivatives. The ethylenically unsaturated monomers (B2) preferably contain at least one monomer that contains at least 2 double bonds, such as methylene bisacrylamide, an allylic ester of acrylic acid, diallylester of phthalic acid and glycoldiacrylic acid ester. Preferred is methylene bisacrylamide. The use of monomers comprising at least 2 double bonds leads to the formation of a branched and/or crosslinked acrylic copolymer.

The matting polymer (B) useful in the present invention is preferably selected from anionic acrylic copolymers obtained by polymerization of at least 50%, more preferably at least 65% and most preferably at least 75%, by weight of (meth)acrylic acid and/or a salt thereof and of at least 0.003% (preferably at least 0.01%) and not more than 5% (preferably not more than 1%, more preferably not more than 0.3%, most preferably not more than 0.1%) by weight of at least one ethylenicaly unsaturated monomer that contains at least 2 double bonds, such as methylene bisacrylamide, an allylic ester of acrylic acid, diallylester of phthalic acid and glycoldiacrylic acid ester. Preferred is methylene bisacrylamide.

Suitable anionic acrylic polymers have been described in U.S. Pat. No. 4,554,018, the content of which is herein incorporated by reference. These anionic acrylic polymers have been described as polymeric thickeners.

Commercially available anionic acrylic copolymers can be used as such or their free carboxylic groups can be partially or completely neutralized with a base (B1) as described here above. This neutralization improves the solubility and/or dispersibility in water of the resin and also permits to obtain a solution in water with a pH of at least 5.

The anionic acrylic copolymers preferably pre-diluted in water and, if needed, further neutralized with a base (B1) in order to attain a pH higher than 6, preferably of at least 7. Increasing the pH of anionic acrylic polymer solutions or dispersions leads to an increase of their viscosity. The anionic acrylic polymer resins particularly useful for this invention, preferably present an increase in viscosity at higher pH so that they only have a negligible impact on the rheology and viscosity of the formulation with radiation curable polymer, at the level of addition of polymer (B) in the amount needed to obtain the required matting effect.

The anionic acrylic copolymers particularly useful in the present invention are generally those having a viscosity in the range of 10 to 10000 mPa·s, as measured on a 0.5% by weight (solids) water solution of the anionic acrylic polymers at a pH of at least 7, preferably of from 7 to 8, most preferably at a pH of 7, according to DIN EN ISO 3219, with a Cone & plates rotational viscometer at 25° C. and with a defined shear rate of 20 s$^{-1}$; pH adjustment, if necessary, is made with a 0.01N NaOH solution in water. Preferred anionic acrylic polymers have a viscosity of at least 100 mPa·s; more preferred are those having a viscosity not exceeding 5000 mPa·s.

The aqueous composition according to the invention preferably contains at least 20%, more preferably at least 30% by weight of radiation curable polymer (A). The quantity of radiation curable polymer (A) preferably does not exceed 60% by weight. The weight % is expressed on dry weight of the polymers (A) and (B). The aqueous composition according to the invention preferably contains at least 0.1%, more preferably at least 0.3%, most preferably at least 0.4%, by weight of matting polymer (B). The quantity of matting polymer (B) generally does not exceed 3%, preferably does not exceed 2%, most preferably does not exceed 1.5%, by weight of the aqueous composition. The matting polymer used in the compositions according to the invention does not significantly impact the storage stability of the compositions, especially when compared to known inorganic matting agents. No settling is observed after long periods of storage at room temperature. The shelf life of the radiation curable composition is almost as long as the shelf life of a radiation curable composition not containing the matting polymer. The aqueous radiation curable composition according to the invention generally has a shelf life at 60° C. of more than one day, often even at least one week.

The aqueous radiation curable composition is preferably prepared by adding the matting polymer (B) to an aqueous dispersion of the radiation curable polymer (A).

In order to facilitate the blend of the matting polymer in the dispersion of the radiation curable polymer and avoiding any flocculation of said polymer due to low pH, the matting polymer (B) is preferably dissolved, pre-diluted or dispersed in water and partially or completely neutralized with a base, preferably a base (B1) as described here above, in order to obtain a water solution/dispersion with a pH of minimum 6, preferably not higher than 8 and most preferably at least 7, as measured at a concentration of 5% solids. pH values are measured at 25° C. with a Metrohm 827 instrument according to DIN ISO 976.

The radiation curable composition according to the present invention can comprise at least one polymerizable ethylenically unsaturated compound. Typically this polymerizable ethylenically unsaturated compound is a (meth)acryloyl-compound that preferably is selected from (meth)acrylated compounds comprising one or more (meth)acryl groups, more in particular one or more acryl groups. Examples of such compounds include urethane (meth)acrylates, polyester (meth)acrylates, (meth)acrylic (meth)acrylates, polyether (meth)acrylates, polycarbonate (meth)acrylates, silicone (meth)acrylates and lower molecular weight (meth)acrylates, as well as mixtures thereof. By lower molecular weight (meth)acrylates is understood (meth)acrylates having a molecular weight of at most 1000, preferably at most 500. Molecular weights of such lower molecular weight compounds are typically calculated, but could also be measured via gel permeation chromatography (GPC).

The radiation curable composition according to the invention can further comprise one or more other aqueous resins such as acrylics, polyesters, alkyds, epoxies, polyurethanes, fluorocarbon compounds, silicone compounds.

The radiation curable composition of the invention can be further formulated with the auxiliaries and adjuvants used in the radiation curable coating technology, such as flow control agents, dyes, wetting agents or surface tension reducer additives, photo protective or anti-yellowing additives, waxes, antifoaming agents, thickeners and photoinitiators. Other possible additives are adhesion promoters, pigments, fillers, dispersing agents, additives to adjust the coefficient of friction, anti-static agents, organic matting agents different from (B).

The radiation-curable compositions according to the present invention are preferably curable by ultraviolet irradiation, generally in the presence of photoinitiator. They can also be cured by electron-beam irradiation, allowing the use of compositions free of photoinitiator. The compositions according to the invention are providing rapid curing.

The aqueous radiation curable compositions according to the invention have a low viscosity without the use of solvent or high amount of monomers. This makes them suitable for different applications, in particular for field-applied coatings.

The coatings obtained from the compositions according to the invention result in selective mechanical properties that allow covering many different application areas as, for example, coatings for wood, plastic, glass, metal, composites such as vinyl composition tiles (VCT) and concrete.

The radiation curable compositions according to the invention permit to obtain matt coatings, having a gloss that is substantially lower than the one obtained with compositions not containing the matting polymer, but having the same composition or containing the same amount of a thickener resin instead of the matting polymer.

The present invention therefore relates to an aqueous radiation curable composition providing a coating, after curing, that has a gloss at 20° measured according to ISO 2813 of at least 30% lower than the same composition without the matting polymer (B).

The present invention also relates to a coating obtained from the composition according to the invention that, after curing, has a gloss at 20° measured according to ISO 2813 of at least 30% lower than the same composition without the matting polymer (B).

Addition of the anionic acrylic polymers described in this invention, in the quantities needed to obtain the desired matt effect, has no or minor impact on the viscosity and rheology of the formulations at pH around 7. The coating compositions permit to obtain matt coatings with a gloss similar or lower than the same compositions containing a similar amount of inorganic matting agents such as $SiO_2$ particles. The coating compositions according to the invention have very good shelf life, at the same level as the glossy formulations made with the same composition except from the matting polymer; they have a shelf life which is significantly higher than similar compositions comprising inorganic matting agents that provide similar matt level. Homogeneous matt coatings are obtained with an 'in deep' matting effect avoiding the difference in gloss after wearing. The coating compositions according to the invention permit to obtain homogeneous matt coatings which is substantially independent of the coating thickness in the range of 10 to 100 μm, preferably 15 to 50 μm.

The compositions according to the invention permit to obtain coatings which after radiation curing show an excellent chemical resistance against water, solvents and stains, a superior mechanical resistance against scratch and abrasion.

The compositions according to the invention have a combination of properties which makes them particularly suitable to be used for field applied coatings, especially for floor coatings. They are also suitable to be used for field applied coatings of other construction substrates such as for timber coating.

Although the radiation curable compositions according to the invention permit to obtain matt coatings without the use of inorganic matting agents, inorganic matting agents may be added to the compositions in order to obtain an even lower gloss level.

Applicants have surprisingly found that compositions comprising a radiation curable polymer (A), a matting polymer (B) and an inorganic matting agent (C) permit to obtain coatings having a lower gloss level than those not containing the matting polymer (B).

The present invention therefore also relate to an aqueous radiation curable composition comprising, besides the radiation curable polymer (A) and the matting polymer (B) as described here above, at least one inorganic matting agent (C).

The invention more particularly relate to an aqueous radiation curable composition comprising from 20 to 60% by weight of a radiation curable polymer (A), from 0.1 to 3 wt % of matting polymer (B) and from 0.1 to 5% of at least one inorganic matting agent (C). Often, the amount of (C) is at least 0.5%, preferably at least 1%, more preferably at least 2%.

By inorganic matting agent, is intended to designate inorganic particulates substantially insoluble in water or in the organic polymer, that can be dispersed in the aqueous radiation curable compositions. Inorganic oxide particulates are generally preferred as inorganic matting agent and most preferably silica particles.

The term "particulate" is used to refer to solid, either singularly or a collection thereof (e.g., powder) including spheroid(s), granule(s), fragment(s), or pieces(s) of matter having regular or irregular shape or surface.

The term "inorganic oxides" is used to describe a compound, especially a binary compound, of at least an element and oxygen and include metal and semimetal oxides. Examples of such oxides may comprise $SiO_2$, $Al_2O_3$, $AlPO_4$, $MgO$, $TiO_2$, $ZrO_2$, $Fe_2O_3$ or mixtures thereof. Mixed inorganic oxides may be prepared by conventional preparation techniques, e.g. coblending, coprecipitating, cogelling etc. The oxides may be in a variety of forms, including gelled, precipitated, fumed, colloidal, etc. Inorganic oxides may also include natural minerals, processed/activated minerals, montmorillonite, attapulgite, bentonite, diatomite, quartz sand, limestone, kaolin, ball clay, talc, pyrophyllite, perlite, sodium silicate, sodium aluminum silicate, magnesium silicate, magnesium aluminum silicate, silica hydrogel, silica gel, fumed silica, precipitated silica, dialytic silica, alumina zeolite, molecular sieves, diatomaceous earth, reverse phase silica, bleaching clay, and mixtures thereof.

These compositions comprising an inorganic matting agent present further advantages in comparison with comparable compositions not containing the matting polymer (B): the same matting effect is obtained with less inorganic matting agent, limiting the drawback already mentioned in term of formulation stability and homogeneity of the coatings. The second advantage is the possibility to reach extremely high matting effect (gloss lower than 5) that cannot or that is very difficult to obtain in another way.

The coating compositions according to the invention permit to obtain matt coatings that combine homogeneous appearance, high in deep matt aspect, low impact of the wearing on the gloss of the coating and high shelf life of the composition. The coating compositions comprising the inorganic matting agent, permit to obtain coatings that have a gloss at different angles, 20°, 60° and 85°, which are very similar and low.

The present invention therefore also relates to an aqueous radiation curable composition providing a coating, after curing, that has a gloss at 20°, 60° and 85° of lower than 15, preferably lower than 10, as measured according to ISO 2813 on a 40µ dry coating applied on a black Leneta sheet. More particularly the present invention relates to such compositions that have in addition a shelf life at 60° C. of more than one day, often even at least one week. These compositions typically comprise a radiation curable polymer (A), a matting polymer (B) and an inorganic matting agent (C), preferably silica particles.

The present invention further relates to an aqueous radiation curable composition providing a coating, after curing, that has a difference in gloss measured according to ISO 2813 at angles of 20°, 60° and 85° of less than 10, preferably less than 7, as measured on a 40µ dry coating applied on a black Leneta sheet. More particularly the present invention relates to such compositions that have in addition a shelf life at 60° C. of more than one day, often even at least one week. These compositions typically comprise a radiation curable polymer (A), a matting polymer (B) and an inorganic matting agent (C), preferably silica particles.

The present invention also relates to coatings, after curing, that have a gloss at 20°, 60° and 85° of lower than 15, preferably lower than 10, measured according to ISO 2813 as described supra. More particularly, the present invention relates to such coatings that are obtained from a composition according to the invention, more specifically from a composition comprising a radiation curable polymer (A), a matting polymer (B) and an inorganic matting agent (C), preferably silica particles.

The present invention further relates to coatings, after curing, that have a difference in gloss at angles of 20°, 60° and 85° of less than 10, preferably less than 7, measured according to ISO 2813 as described supra. More particularly, the present invention relates to such coatings that in addition are obtained from a composition according to the invention, more specifically from a composition comprising a radiation curable polymer (A), a matting polymer (B) and an inorganic matting agent (C), preferably silica particles.

Compositions providing coatings having such gloss performances have never been described before.

The compositions according to the present invention comprising a radiation curable polymer (A), a matting polymer (B) and optionally an inorganic matting agent (C) are suitable for a large variety of applications. They are for instance suitable for factory applied applications such as flooring and cabinets coating. They are also particularly suitable for field applied applications on a wide variety of flooring substrates like wood, plastic, concrete, composites such as MDF, plastic-wood composites for decks and terrazzo, resilient flooring such as VCT, vinyl, linoleum, rubber and cork. They are also suitable for field applied applications on vertical substrates especially for trim coating such as coating of window frames, doors, shutters, fences, timbers.

The compositions according to the invention can be used both for indoor and outdoor applications. The composition according to the invention permits to obtain coatings suitable for use as a single layer coating or as one or more layers in a multi-layer system.

These coatings also exhibit a good adhesion on porous and non-porous substrates.

The compositions according to the invention are also particularly suitable for coating wood substrates and plastic articles, especially objects made from polyethylene, polypropylene, polycarbonate, polyvinylchloride, PMMA or polymeric blends, optionally precoated with other coatings such as polyurethanes, polyacrylics, polyesters. The plastic substrates can also be optionally pretreated by corona treatment, atmospheric plasma treatment, flame, chemical plasma and the like.

The present invention therefore also relates to the use of the compositions for making inks, varnishes or coatings and to a process for making inks, varnishes or coatings wherein a composition as described here above is used.

The present invention also relates to a process for preparing a coated substrate or article comprising a step wherein the substrate or article is coated with a radiation curable composition according to the invention, and preferably, further submitted to curing, particularly under irradiation with UV light or electron beam.

The present invention more particularly relates to a process and the use of the compositions for making low gloss coatings in a large variety of applications. Applications include factory applied applications such as flooring and cabinets coating as well as field applied applications on a wide variety of flooring substrates like wood, plastic, concrete, composites such as MDF, plastic-wood composites for decks and terrazzo, resilient flooring such as VCT, vinyl, linoleum, rubber and cork, and field applied applications on vertical substrates especially for trim coating such as coating of window frames, doors, shutters, fences, timbers.

The present invention more particularly relates to a process and the use of the compositions for making field applied low gloss coatings, especially on wood, plastic, concrete and composite substrates.

The present invention more particularly relates to a process and the use of the compositions for making field applied coatings, especially floor coatings. The present invention more specifically relates to a process for preparing a coated substrate or article comprising a step wherein the floor is coated with a layer of 30 to 300 μm (wet layer) of a radiation curable composition according to the invention, dried and cured by irradiation.

The present invention also relates to an article or substrate coated or treated with, either partially or entirely, with a composition of the invention. Preferably articles or substrates are made from wood, plastic, concrete and composites.

The examples which will follow illustrate the invention without limiting it.

PREPARATION EXAMPLE ANIONIC ACRYLATE POLYMER 1

An anionic acrylic polymer as described in Example 1J of U.S. Pat. No. 4,554,018 has been prepared. A 5 wt % solution in water has been obtained.

PREPARATION EXAMPLE ANIONIC ACRYLATE POLYMER 2

An anionic acrylic polymer as described in Example 1L of U.S. Pat. No. 4,554,018 has been prepared, except that the mineral oil and the hydrocarbon described therein have been replaced with heptane. Water and heptane have been distillated after the addition of the nonylphenol ethoxylate. A white powder was obtained.

EXAMPLE 1

An aqueous radiation curable composition is formed by mixing 100 g of a radiation curable polyurethane dispersion commercialized by CYTEC under the name of UCECOAT®7733 (comprising 38% dry weight of radiation curable polyurethane), 2 g of photoinitiator BCPK, 3 g of a oxidized HD polyethylene wax dispersion AQUAMAT®208, 0.3 g of a wetting agent, 0.2 g of an antifoaming agent and 24 g of the 5 wt % solution of anionic acrylic polymer 1 as described in preparation example 1.

EXAMPLE 2

To the composition of Example 1 was added 1.5 g of a silica matting agent (ACEMATT®TS100) and 20 g of water.

COMPARATIVE EXAMPLES CR1 and CR2

The compositions of CR1 and CR2 have been prepared as in, respectively, Examples 1 and 2 except that the anionic acrylic polymer 1 was replaced by 1.5 g of a 33 wt % dilution in water of a polyurethane thickener commercialized as UCECOAT®8460.

Evaluations:

The viscosity of the different compositions was measured according to ISO 2431 (also called DIN cup method). The DIN cup system is a simple gravity device that evaluate the viscosity by measuring the timed flow of a known volume of liquid passing through an orifice located at the bottom. A completely filled BYK-Gardner Din cup with inner dimension in concordance with DIN53211 was used. Viscosity was measured at 23° C. and expressed in seconds. The average value of three measurements is taken as the efflux time. A viscosity of between 30 and 35 seconds is preferred for applying coatings.

The compositions of Examples 1, 2, CR1 and CR2 were applied on a black Leneta sheet and on a glass plate with a roller coater in order to obtain a 120μ wet coating, dried during 10' at 40° C. and cured with a 80 W/cm Hg lamp at 5 m/min.

The compositions of Examples 1, 2, CR1 and CR2 were also applied in a multi-layer coat on wood (such as Sapelli wood panels) and cement panels applied in 3 coats with 9 mm pile roller coater in order to obtain a 200μ wet coating, air dried at room temperature. No UV cure was made between the first and the second coat. The second coat was partially cured with one pass of a mobile UV curing device (HID Bulldog equipped with an 80 W/cm Hg lamp) at 10 m/min field and sanded. The third coat was dried overnight at room temperature and fully cured with 1 pass at 7 m/min with the UV curing device.

The compositions of Examples 1, 2, CR1 and CR2 were applied on VCT tiles (over the factory finish) with a blue Padco T-bar applicator in order to obtain a 150μ wet coating and dried at room temperature and the open time and wet edge properties were evaluated at follows: a first coat of 6 inches wide is applied to the center of the substrate, from top to bottom. Three X-marks are then scribed vertically onto the center of the coating using the folded edge of a lab towel. At predetermined intervals, a second coating is applied over each X-mark at a perpendicular angle. The second application should extend 1 to 2 inches beyond each edge of the first application. During the second application, brush over the X and each edge, applying a significant pressure, for 5 cycles, to eliminate/reduce any visible overlap marks at the edges or at the X once the coating is dry. The coating is then allowed to dry completely and evaluated visually to find the highest time interval with no visible markings. Visible X's represent open time and visible edges represent wet edge performance.

The gloss of the coatings was measured according to ISO 2813 as described here above. The results are presented in Table 1

TABLE 1

|  |  | Ex. 1 | Ex. 2 | CR 1 | CR 2 |
|---|---|---|---|---|---|
| Viscosity DIN cup at 23° C.:<br>Measure of gloss |  | 30" | 35" | 32" | 32" |
| Coating on black<br>Leneta: | 20°<br>60°<br>85° | 45<br>81<br>98 | 4<br>22<br>31 | 83<br>94<br>107 | 17<br>53<br>80 |
| Coating on glass plate | 20°<br>60°<br>85° | 66<br>92<br>97 | 11<br>31<br>28 | 154<br>132<br>117 | 30<br>55<br>67 |
| Coating on Sapelli<br>wood | 20°<br>60°<br>85° | 1.6<br>12<br>18 | 0.5<br>4.3<br>4.8 | 3.7<br>23<br>28 | 1.8<br>15<br>19 |
| Coating on VCT tiles<br>Open time (VCT tiles)<br>Wet edge (VCT tiles) | 60° | 44<br>4-5 min<br>2 min | 7.2<br>4-5 min<br>6 min | 76<br>2 min<br>1 min | 23<br>3 min<br>1 min |

Table 1 shows that the addition of the matting polymer (anionic acrylic polymer 1 as described in Preparation Example 1) decreases the gloss of films and coatings obtained with the compositions that do not contain silica matting agent with only limited effect on the rheology (viscosity) of the dispersion.

The gloss measured at 20° is decreased by at least 40% compared to the gloss obtained without the anionic acrylic polymer.

The same decrease of gloss can be seen when anionic acrylic polymer 1 is added to a silica containing formulation.

Addition of the matting polymer improves significantly the open time and the wet edge of the coatings.

EXAMPLE 3

An aqueous radiation curable composition is formed by mixing 100 g of a radiation curable polyurethane dispersion commercialized by Cytec under the name of UCE-COAT®7890 (35% solids), 1.5 g of photoinitiator, 3 g of a wax dispersion, 0.5 g of antifoaming agent commercialized under the name of ADDITOL®VXW4973, 8 g of a 5% solution in water of anionic acrylic polymer 1 as described in Preparation Example 1 and 2 g of a 33% dilution in water of polyurethane thickener UCECOAT®8460.

COMPARATIVE EXAMPLE R 3

CR 3 is the same formulation as Example 3 except that the anionic acrylic polymer 1 was omitted and was replaced with 2 g of silica matting agent ACEMATT®TS 100;

The stability of the compositions of Example 3 and Comparative Example 3R was measured by visual checking of the aspect, after a specified number of days, of 250 ml glass bottles filled with around 200 g formulation, stored in an oven at 60° C.

The results obtained are presented in Table 2.

TABLE 2

|  | Ex. 3 | CR 3 |
| --- | --- | --- |
| T° ageing at 60° C.: | | |
| 1 day | OK | 0.5/6 cm settling |
| 2 days | OK | Settling, but still remixable. |
| 3 days | OK | Hard settling. |
| 4 days | OK | Stopped |
| 7, 11, 14 days | OK | |
| 24 days | OK (stopped) | |
| Ageing at room T° | Still ok after 9 months without any precipitation. (DIN cup Viscosity: 35") | Hard settling after 4 months. Not possible to remix anymore. |

As shown in Table 2 the radiation curable compositions according to the present invention have a significantly improved stability over silica containing compositions.

The compositions of Example 3 and Comparative Example 3R were applied on Beech panel by coating with the method described here before for coating on wood.

The coating properties are presented in Table 3.

Coating Evaluation Procedures

Adhesion test (Cross-hatch): this evaluation can be applied on any single or multilayer radiation cured coating on any of the above mentioned substrates. A square pattern is engraved in the coating with a cutter. A string of adhesive tape (TESA®4651) is pressed on the surface. The tape is then pulled off. Based on the number of squares removed by the tape, a value of adhesion is given ranging from 0=perfect result, to 5=worst result.

Erichsen test: is a common method for the measurement of the hardness of protective coatings. The estimated or known spring tension on the instrument (Model 318) is set with the help of a slider. Holding the instrument upright and placing the point of the stylus (Bosch, 0.75 mm) on the test substrate, one subsequently draws a 5 to 10 mm long line at a speed of approximately 10 mm/sec. The stylus should produce a scratch which is barely visible with the naked eye. If the spring force is too high, the scratch is too clearly visible; if it is too low, no scratch appears. The coating hardness corresponds to the applied force (Newtons) which leads to the apparition of a first visible scratch of the coating. A higher hardness is expected to provide a better protection against any exposure to scratching conditions during storage and use.

Pencil hardness: Pencil hardness testing is a simple method for determining scratch resistance and hardness of a coating, and is performed as follows: An operator points with a pencil at a 45 angle onto a coated panel, which is kept in place on a horizontal surface. The test is repeated with pencils of increasing hardness until one or both of the following defects are marked on the coating: a permanent deformation of the paint without cohesive fracture, or a cohesive fracture of the paint. In other words: a visible scratch or a rupture in the surface of the paint. The reported value is the hardness of the hardest pencil which gave no defect on the coating. This method is based on the ISO 15184 method and is preferably performed using the Elcometer 501 Pencil Hardness Tester.

Hamberger(-Hobel) test: A fully cured coating system is placed on the Hamberger-Hobel tester, an apparatus obtainable from Hamberger. The apparatus is equipped with a screw which may be turned in such a way that the pressure exerted by a coin on the coating can be varied. The pressure is increased step by step until a scratch of a few centimeters is formed on the coated surface. The higher the applied pressure before the scratch is formed, the better the scratch resistance. The scratch resistance is expressed in Newton.

Stain resistance test: The method covers the chemical resistance of a coating of 60 μm thick which was wet applied to a non-porous substrate, typically half white, half black Leneta paper is being used. The coating was dried for 5 minutes at 60° C. and then cured under a 80 W UV-lamp (Hg) at a conveyor speed of 5 m/min. The stain resistance is assessed by putting a test substance onto the coating, cover it with a microscope glass and leave it typically for 4 to 16 hours. The test substances used are specified in Table 3. The stains are then cleaned by washing with a couple of rubs using a tissue that was saturated with isopropanol. The remaining stains are assessed visually using a 0 to 5 scale, assigning 0 to the best performing coating. A high value (0) is expected to provide the best protection against any household product spillage.

TABLE 3

|  | Ex. 3 | CR 3 |
| --- | --- | --- |
| Adhesion: | 0 | 0 |
| Gloss 60° angle | 7 | 5 |
| Pencil hardness | 9 H | 8 H |
| Erichsen test: | <6 | <6 |
| Hamberger test: | <17 | 17 |
| Stain resistance: | 4-24 hours testing time. | |
| 9% Javel | 0-0 | 1-1 |
| 7% acetic acid | 0-0 | 0-0 |
| 2% Eosin B | 1-⅔ | 0-0 |
| 10% NH3 | ½-3 | 1-3 |

TABLE 3-continued

|  | Ex. 3 | CR 3 |
| --- | --- | --- |
| 10% NaOH | 3-3 | 3-5 |
| 1/1 Ethanol-water | 1-1 | 1-1 |
| Arachide oil | 0-0 | 0-0 |
| Coffee | 0-0 | 0-0 |
| Ketchup | 0-0 | 0-0 |

The formulation according to Example 3 was aged during 9 months at room temperature and thereafter applied on Beech panels as described here above.

As shown in Table 4 the properties of the aged formulation were similar to those obtained with the same formulation made one day before coating (said fresh formulation)

TABLE 4

| Formulation | Aged formulation | Fresh formulation |
| --- | --- | --- |
| Adhesion: | 0 | 0 |
| Gloss 20-60-85° angle | 1.6-12.1-45.1 | 1.6-12.1-46.3 |
| Pencil hardness: | 9 H | 9 H |
| Erichsen test: | <6 | <6 |
| Hamberger test: | 17 | 17 |
| Stain resistance: 24 hours testing time | | |
| 9% Javel | 0 | 0 |
| 7% acetic acid | 0 | 0 |
| 2% Eosin B | 1 | 1 |
| 10% NH3 | 1-2 | 1-2 |
| 10% NaOH | 3 | 3 |
| 1/1 Ethanol-water | 0 | 0 |
| Arachide oil | 0 | 0 |
| Coffee | 0 | 0 |
| Ketchup | 0 | 0 |
| Mustard | 0 | 0 |

Tables 2, 3 & 4 show that compositions according to the invention provide the same matting effect than those containing a silica matting agent, but have a much higher stability (shelf life).

Nine months storage at room temperature has no significant impact on the performances of the coating made with the composition according to the invention.

EXAMPLES 4 AND 5 AND COMPARATIVE EXAMPLES CR 4, CR5, CR6, CR7, CR8 and CR9

An aqueous radiation curable composition is formed by mixing 100 g of a radiation curable polyurethane dispersion commercialized by CYTEC under the name of UCECOAT® 7733 (38% solids), 2 g BCPK photoinitiator, 5 g of an oxidized HD polyethylene wax dispersion, 0.5 g of leveling agent and a quantity of thickener agents diluted in water at 5% dry solids as described in Table 5. The Cone&Plate viscosity measured according to DIN EN ISO 3219 of the different thickeners is presented in Table 5.

TABLE 5

| Example | Thickener | Viscosity (Cone&Plates viscosity at 0.5% dry solids *) | Quantity added (%/PUD-dry solids) |
| --- | --- | --- | --- |
| 4 | Anionic acrylic polymer 1 | 223 mPa · s at pH 7.9 | 1 |
| 5 | Anionic acrylic polymer 2 | 3100 mPa · s at pH 7.1 | 0.5 |
| CR4 | Polyether thickener RHEOLATE ®350 | <1 mPa · s at pH 7 | 1 |
| CR5 | Polyurethane thickener UCECOAT ®8460 | <10 mPa · s at pH 6.7 | 1.6 |
| CR6 | Polyacrylate thickener ACRYSOL ®ASE 60 | 1.5 mPa · s at pH 7.3 | 3 |
| CR7 | Acrylic thickener ACRYSOL ® RM 55 | <1 mPa · s at pH 7.8 | 1.5 |
| CR8 | Polyacrylic acid MW 1600 (Aldrich) | <1 mPa · s up to pH 10 | 1.6 |
| CR9 | Polyacrylic acid MW 23000 (Aldrich) | not measurable at pH 7.5 (almost gel) | 0.5 |

* DIN EN ISO 3219 as described in the description of component (B)

The compositions were applied on different substrates as described in Examples 1 and 2 (120μ wet coating on Leneta). The properties of the coatings obtained are presented in Table 6.

TABLE 6

| Example | Din cup Viscosity | Coating appearance | Gloss at 60° | Gloss at 85° |
| --- | --- | --- | --- | --- |
| 4 | 30" | Homogeneous & mat | 27 | 72 |
| 5 | 32" | Homogeneous & mat | 32 | 74 |
| CR4 | 45-50" | No matting effect | 90 | 110 |
| CR5 | >50" | No matting effect | 91 | 109 |
| CR6 | 50" | Microfoaming-orange peel | 76 | 101 |
| CR7 | 25" | Uneven film formation | 77 | 92 |
| CR8 | <20" | No matting effect | 95 | 110 |
| CR9 | Too high to be measured | No matting effect | 98 | 102 |

Table 6 shows that the compositions according to the invention give an improved matting effect.

Other commercially known thickeners or acrylic polymers have a too high rheological impact, no matting effect or are not compatible enough with the radiation curable polyurethane dispersions at the level required to have a matting effect.

EXAMPLES 6 AND 7 AND COMPARATIVE EXAMPLE CR10

An aqueous radiation curable composition is prepared by mixing 100 g of a radiation curable polyurethane dispersion commercialized by CYTEC under the name of UCECOAT®7733 (38% solids), 1.5 g of BCPK photoinitiator, 4 g of oxidized HD polyethylene wax dispersion AQUAMAT®208, 0.5 g of polyether modified siloxane surfactant BYK®345, 0.3 g of wetting agent TEGOWET®270, 0.2 g of antifoam agent TEGO AIREX®902W, 0.2 g of antifoam agent TEGOFOAMEX®805, In Example 6: 40 g of a 3% solution in water of anionic acrylic polymer 1 has been added.

In Example 7: 40 g of a 3% solution in water of anionic acrylic polymer 1 and 2 g silica matting agent ACEMATT®OK412 (EVONIK) have been added.

In Comparative Example CR10 2.3 g of a 33% dilution in water of polyurethane thickener UCECOAT®8460 have been added.

The compositions of Examples 6 and 7 and CR10 have a viscosity (Din Cup) between 20 and 25" and show a perfect surface wetting of the PVC floor substrate.

45-55μ wet coatings are applied in one coat on a PVC substrate with a short pile roller and are air dried at room T° for 3 hours.

They are then cured with one pass of the mobile UV curing device HID Bulldog at 12 m/min.

Coatings on Leneta and glass have further been made in the same way as in examples 1 and 2.

The Persoz hardness evaluates the hardness by measuring the damping time of an oscillating pendulum. The test is based on ISO 1522 using an Elcometer 3045 hardness Testure and measures the time (in seconds) taken for the amplitude of oscillations to decrease from 12° to 4° on a 120 μm wet layer applied and cured on a glass plate as described in Example 1.

The results obtained are presented in Table 7.

TABLE 7

|  |  | Ex 6 | Ex 7 | CR10 |
|---|---|---|---|---|
| Substrate: PVC substrate 1 (light beige) | | | | |
| Warft/weft direction | 20° | 1.5-1.9 | 1.3-1.3 | 3.4-4.2 |
| | 60° | 11.1-12.6 | 4.4-4.0 | 15-20.6 |
| | 85° | 7.7-25.2 | 4.2-4.7 | 20.2-33 |
| Cross-hatch adhesion | | 0 | 0 | 0 |
| Substrate: PVC substrate 1 (brown) | | | | |
| Warf/weft direction | 20° | 1.5-1.6 | 0.9-0.7 | |
| | 60° | 9.6-12.7 | 4.2-3.7 | |
| | 85° | 12.4-24.0 | 5.5-3.0 | |
| Cross-hatch adhesion | | 0 | 0 | |
| Substrate: black Leneta | | | | |
| 100 μm wet film (mean value 3 measurements) | 20° | 14.9 | 0.4 | 28.1 |
| | 60° | 56.3 | 5.1 | 74.8 |
| | 85° | 78.5 | 6.9 | 113.5 |
| Substrate: glass | | | | |
| 120 μm wet film | 20° | 70.3 | 3.6 | |
| | 60° | 102.8 | 12.0 | |
| | 85 | 96.6 | 7.4 | |
| Persoz hardness | | 313 sec | 188 sec | 199 sec |
| T° ageing test at 60° C.: | | More than 1 week | More than 1 week | Hard settling after 1 day |

Table 7 shows that combination of the anionic acrylic polymer of the invention and a silica matting agent permits to obtain a matt formulation which provides a gloss at 20°, 60° and 85° which is low and very similar. Gloss levels on Black Leneta sheets of lower than 10 can be obtained for each of the observation angles (20°, 60° and 85°). Such gloss levels cannot be obtained with the use of silica matting agents alone. Moreover the compositions according to the invention have a significantly improved shelf life over the known compositions comprising similar amounts of silica matting agents.

EXAMPLES 8 AND 9 AND COMPARATIVE EXAMPLE CR11

An aqueous radiation curable composition is obtained by mixing 100 g of a radiation curable polyurethane dispersion commercialized by CYTEC under the name of UCECOAT®7631 (35% solids), 1.5 g of BCPK photoinitiator, 0.5 g of TPO-L (photoinitiator), 4 g of oxidized HD polyethylene wax dispersion AQUAMAT®208, 1 g of polyether modified siloxane surfactant BYK®346, 0.3 g of antifoam agent TEGO AIREX®902W and 2 g of silica matting agent ACEMATT®OK 412 g.

In Example 8 40 g of the 3% solution in water of polyacrylate resin 1 have been further added.

In Example 9 30 g of a 3% solution in water of polyacrylate resin 1, 15 g of white pigment LUCONYL® 0022 and 0.5 g of black pigment have been further added. Grey pigmented coat are obtained with this formulation.

In Comparative Example CR11 1.5 g of a 50% solution in water of polyurethane based thickener UCECOAT®8460 have been further added.

Coating on fibre cement panels have been made with the procedure described for examples 1 & 2 (without sanding between the $2^{nd}$ and $3^{rd}$ layer). Overall wet lay-up is between 210 and 240μ.

Evaluation of the obtained coatings can be found in the table 8.

TABLE 8

|  |  | Ex 8 | Ex 9 | CR11 |
|---|---|---|---|---|
| Gloss level | 20° | 0.2-0.2 | 0.7-0.8 | 1.4-1.5 |
| | 60° | 2.1-2.2 | 4.4-4.5 | 12.7-12.3 |
| | 85° | 3.0-3.1 | 7.8-7.3 | 34.1-32.3 |
| Cross-hatch adhesion | | 0 | 0 | 0 |

The results presented in Table 8 show that the addition of an acrylic matting agent according the invention has a clear effect on the matting of the coating on cement. Gloss levels at different angles which are significantly lower than those obtained without the acrylic matting agent are obtained. The same effect has been observed pigmented coatings.

EXAMPLES 10 AND 11

Examples 10 and 11 are a reproduction of Examples 8 and 9 wherein UCECOAT®7631 is replaced by UCECOAT®7689. Similar gloss levels and adhesion results are obtained.

EXAMPLE 12

An aqueous radiation curable composition is obtained by mixing 100 g of a radiation curable polyurethane dispersion commercialized by CYTEC under the name of UCECOAT®7733 (38% solids) and 20 g of a 14 wt % solution in water of anionic acrylic polymer 1.

EXAMPLE 13

The composition of Example 12 was added with 0.5 g of a dispersing agent commercialized under the name Tegodisperse®750W.

The compositions of Examples 12 and 13 were aged by a stay of 7 days at 60° C. The viscosities of the compositions before and after ageing were measured according to DIN ISO 3219 with a cone and plate rotational viscosimeter at 25° C. at 3 different shear rates of 4, 20 and 100 s$^{-1}$ and the results are reported in table 9.

TABLE 9

|  | Ex. 12 | | Ex. 13 | |
|---|---|---|---|---|
| Shear rate (s$^{-1}$) | Initial viscosity mPa·s | Viscosity after 1 week at 60° C. mPa·s | Initial viscosity mPa·s | Viscosity after 1 week at 60° C. mPa·s |
| 4 | 714 | 2910 | 654 | 1840 |
| 20 | 510 | 776 | 471 | 553 |
| 100 | 263 | 305 | 250 | 285 |

The composition of Example 12 shows a limited visocity increase after ageing. The addition of a dispersing agent in the composition of Example 13 further limits the viscosity increase as shown by the results obtained at 4 s$^{-1}$.

EXAMPLES 14 AND 15

The compositions of Examples 14 and 15 are prepared according to table 10. The composition of Example 15 is added with 10 g of water to obtain the same viscosity as the composition of Example 14. The values in table 10 are in grams.

TABLE 10

| Formulation | Ex. 14 | Ex. 15 |
|---|---|---|
| Composition of Example 12 | 100 | 100 |
| Water | — | 10 |
| Aquamatt 208 (wax dispersion) | 4 | 4 |
| Tego airex 902W(defoamer) | 0.3 | 0.3 |
| Tegofoamex 805 (defoamer) | 0.3 | 0.3 |
| Tego dispers 750W (dispersing agent) | 1 | 1 |
| BYK 333 (slip agent) | 0.1 | 0.1 |
| BYK 349 (wetting agent) | 1 | 1 |
| Lucerine TPO-L (photoinitiator) | 0.5 | 0.5 |
| Irgacure 500 (photoinitiator) | 1.5 | 1.5 |
| Acematt OK 520 (silica matting agent) | — | 2 |

The compositions of Examples 14 and 15 were applied on a black Leneta sheet with a roller coater in order to obtain a 150μ wet coating, dried at room temperature and cured with a 80 W/cm Hg lamp at 10 m/min. The gloss properties of the obtained coating are reported in table 11.

TABLE 11

|  |  | Ex. 14 | Ex. 15 |
|---|---|---|---|
| Gloss level | 20° | 88.7 | 0.2 |
|  | 60° | 96.1 | 1.5 |
|  | 85° | 121 | 3.2 |

Table 11 shows that combination of the anionic acrylic polymer of the invention and a silica matting agent permits to obtain a matt formulation which provides a gloss at 20°, 60° and 85° which is low and very similar. Gloss levels on Black Leneta sheets of lower than 10 can be obtained for each of the observation angles (20°, 60° and 85°).

The invention claimed is:

1. An aqueous radiation curable coating composition comprising at least one radiation curable polymer (A) and at least one organic matting polymer (B) selected from acrylic copolymers having a viscosity in the range of 10 to 10000 mPa·s, as measured on a 0.5% by weight water solution of the matting organic polymer at a pH of from 7 to 8 according to DIN EN ISO 3219.

2. The composition according to claim 1, wherein the radiation curable coating composition is a dispersion comprising at least one radiation curable polymer (A).

3. The composition according to claim 1, wherein the radiation curable polymer (A) is a radiation curable ethylenically unsaturated polyurethane.

4. The composition according to claim 1, wherein the matting polymer is one having a viscosity in the range of 100 to 5000 mPa·s.

5. The composition according to claim 1, wherein the matting polymer (B) is selected from anionic acrylic copolymers obtained by polymerization of at least 50% by weight of (meth)acrylic acid and/or a salt thereof and from 0.003 to 50% by weight of at least one ethylenicaly unsaturated monomer (component B2) that does not contain any carboxylic groups.

6. The composition according to claim 5, wherein the free carboxylic acid groups of the acrylic copolymer are partially or completely neutralized with a base (B1).

7. The composition according to claim 5, wherein the ethylenically unsaturated monomers (B2) contain at least one monomer that contains at least 2 double bonds.

8. The composition according to claim 1, wherein the matting polymer (B) is selected from anionic acrylic copolymers obtained by polymerization of at least 50% by weight of (meth)acrylic acid and/or a salt thereof and of at least 0,004% and not more than 7% by weight of at least one ethylenicaly unsaturated monomer that contains at least 2 double bonds.

9. The composition according to claim 1, wherein the aqueous composition contains from 20% to 60% by weight of radiation curable polymer (A) and from 0.1% to 3% by weight of matting polymer (B).

10. The composition according to claim 1, further comprising at least one inorganic matting agent (C).

11. The composition according to claim 10, wherein the inorganic matting agent (C) is selected from inorganic oxide particules.

12. The composition according to claim 1, wherein the composition provides a coating, after curing, that has a gloss at 20°, 60° and 85° of lower than 15 as measured according to ISO 2813 on a 40 μ dry coating applied on a black Leneta sheet.

13. The composition according to claim 1, wherein the composition provides a coating, after curing, that has a difference in gloss measured according to ISO 2813 at angles of 20°, 60° and 85° of less than 10, as measured on a 40 μ dry coating applied on a black Leneta sheet.

14. A process for preparing a coated substrate or article comprising a step wherein the substrate or article is coated with a layer of 30 to 300 μm of a radiation curable composition according to claim 1, dried and cured by irradiation.

15. An article or substrate coated with an aqueous radiation curable composition according to claim 1.

* * * * *